(12) United States Patent
Shirai et al.

(10) Patent No.: US 9,601,959 B2
(45) Date of Patent: Mar. 21, 2017

(54) ARMATURE OF ROTATING ELECTRICAL MACHINE

(75) Inventors: Yutaro Shirai, Tokyo (JP); Shinichiro Yoshida, Tokyo (JP); Hironori Tsuiki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 172 days.

(21) Appl. No.: 14/363,958

(22) PCT Filed: Mar. 22, 2012

(86) PCT No.: PCT/JP2012/057306
§ 371 (c)(1),
(2), (4) Date: Jun. 9, 2014

(87) PCT Pub. No.: WO2013/140564
PCT Pub. Date: Sep. 26, 2013

(65) Prior Publication Data
US 2014/0319937 A1 Oct. 30, 2014

(51) Int. Cl.
*H02K 3/34* (2006.01)
*H02K 1/18* (2006.01)
*H02K 1/14* (2006.01)
*H02K 3/52* (2006.01)
*H02K 3/18* (2006.01)

(52) U.S. Cl.
CPC ............... *H02K 3/345* (2013.01); *H02K 3/18* (2013.01); *H02K 3/522* (2013.01); *H02K 1/148* (2013.01); *H02K 2203/12* (2013.01)

(58) Field of Classification Search
CPC .... H02K 2203/12; H02K 3/345; H02K 3/522; H02K 3/46; H02K 3/32; H02K 3/34; H02K 3/38; H02K 3/40; H02K 3/18; H02K 1/148
USPC .......... 310/49.13, 194, 215, 214, 43; 29/596
See application file for complete search history.

(56) References Cited

U.S. PATENT DOCUMENTS 3,339,097 A * 8/1967 Dunn ..................... H02K 3/522
29/596
7,200,917 B2 * 4/2007 Takano .................. H02K 3/522
242/432.3

(Continued)

FOREIGN PATENT DOCUMENTS

JP          60-73343 U      5/1985
JP        2006-149027 A     6/2006

(Continued)

OTHER PUBLICATIONS

WO 2011013273 A1 Description—machine English translation.*

(Continued)

*Primary Examiner* — Quyen Leung
*Assistant Examiner* — Noli Manaloto
(74) *Attorney, Agent, or Firm* — Buchanan Ingersoll & Rooney PC

(57) ABSTRACT

A coil end of a coil is insulated from a stator core by a molded member made of an insulating resin, and the coil, which is positioned in a slot, is insulated by insulating paper. In an armature of a rotating electrical machine, the molded member is divided into a first member and a second member that are rotatably coupled to each other by a hinge.

10 Claims, 14 Drawing Sheets

(56) References Cited

U.S. PATENT DOCUMENTS

| | | | | |
|---|---|---|---|---|
| 2009/0189474 A1* | 7/2009 | van Heyden | .......... | H02K 3/522 310/195 |
| 2009/0243421 A1* | 10/2009 | Matsuura | ............... | H02K 3/522 310/215 |
| 2010/0188181 A1* | 7/2010 | Urano | .................... | H02K 3/522 336/198 |
| 2011/0115317 A1* | 5/2011 | Stark | ...................... | H02K 1/148 310/71 |
| 2011/0273053 A1* | 11/2011 | Oka | ....................... | H02K 3/522 310/215 |

FOREIGN PATENT DOCUMENTS

| | | | |
|---|---|---|---|
| JP | 2008-312326 A | 12/2008 | |
| JP | 2009-106113 A | 5/2009 | |
| JP | 2009106113 A * | 5/2009 | |
| JP | 2010-141963 A | 6/2010 | |
| JP | 2010-200469 A | 9/2010 | |
| JP | 2010-263675 A | 11/2010 | |
| JP | WO 2011013273 A1 * | 2/2011 | ............. H02K 3/325 |

OTHER PUBLICATIONS

WO 2011013273 A1 Drawings—machine English translation.*
WO 2011013273 A1 Bibliography—machine English translation.*
JP 2009106113 Description—English translation.*
International Search Report (PCT/ISA/210) mailed on Jun. 26, 2012, by the Japanese Patent Office as the International Searching Authority for International Application No. PCT/JP2012/057306.
Notification of the First Office Action dated Dec. 3, 2015 issued in the corresponding Chinese Patent Application No. 201280065784.5 and English translation (12 pages).

* cited by examiner

WHEN MOLDED MEMBER 1 IS INSERTED

INSERTION DIRECTION

INSERTION DIRECTION

AFTER STATOR CORE IS INSERTED

INSERTION DIRECTION

INSERTION DIRECTION OF
STATOR CORE

ARMATURE OF ROTATING ELECTRICAL MACHINE

TECHNICAL FIELD

The present invention relates to an armature of a rotating electrical machine, and more particularly, to an insulating structure that insulates an edgewise coil wound on teeth of a stator core of an armature from the stator core.

BACKGROUND ART

Since it is necessary to bend a rectangular wire in a width direction when forming an edgewise coil, a technique for mounting an edgewise coil, which is formed by a machining device, on a stator core of an armature by using an insulating member is disclosed in, for example, PTL 1.

CITATION LIST

Patent Literature

PTL 1: JP-A-2008-312326

SUMMARY OF INVENTION

Technical Problem

The insulating member disclosed in PTL 1 includes a back portion 10 and two side surface portions 12 as shown in FIGS. 2 and 3 of PTL 1, and is inserted into a coil 6 from the back side of the core while the side surface portions 12 are bent so as to face each other so that the coil 6 is supported in a laminating direction by flanges 16 formed at tips of the side surface portions. As a result, the coil and the insulating member are fixed to each other.

Since a gap between the flanges 16 is narrowed by the bending of the side surface portions 12 in this method, the movable range of the flanges is narrow and the dimension of the flange 16 is limited so that the side surface portion is not fractured from the bending. For this reason, the insulation performance of the coil and the stator core at a tooth tip is low, and there is a possibility that the coil 6 may be toward the tooth tip due to vibration during operation and be pulled toward the tooth tip near outer peripheral portions of the coil not supported by the flanges 16.

The invention has been made to solve the above-mentioned problem, and an object of the invention is to provide an armature of a rotating electrical machine of which the assemblability of an insulating member, insulation, and the reliability of the support of a coil have been improved.

Solution to Problem

An armature of a rotating electrical machine according to the invention includes a stator core and a molded member that is formed of an insulating member insulating a coil wound on a tooth of the stator core from the stator core and supporting the coil. The molded member is formed of a first member and a second member that are coupled to each other by rotatable coupling means. Each of the first member and the second member includes a back portion, a coil mounting portion which extends from the back portion and on which a coil end of the coil is mounted, and a flange that is formed at a tooth tip of the coil mounting portion. The coil end of the coil is insulated by the molded member. The coil positioned in a slot of the stator core is insulated from an inner wall of the slot by insulating paper.

Advantageous Effects of Invention

According to the armature of a rotating electrical machine of the invention, the molded member is divided into the first and second members and the first and second members are coupled each other by a rotatable coupling member. Accordingly, assemblability is improved by one-direction assembly of the molded member to the coil.

Further, since it is possible to make the movable range of the flanges of the molded member large, it is possible to make the dimension of the flange large. Accordingly, it is possible to improve insulation performance and the reliability of the support of a coil.

The above-mentioned or other objects, features, and effects of the invention will become more apparent from the detailed description of the following embodiments and drawings.

BRIEF DESCRIPTION OF DRAWINGS

FIG. 14 is a view showing a portion where the molded member and the stator core of the second embodiment of the invention are fixed to each other.

DESCRIPTION OF EMBODIMENTS

First Embodiment

Figure 1:
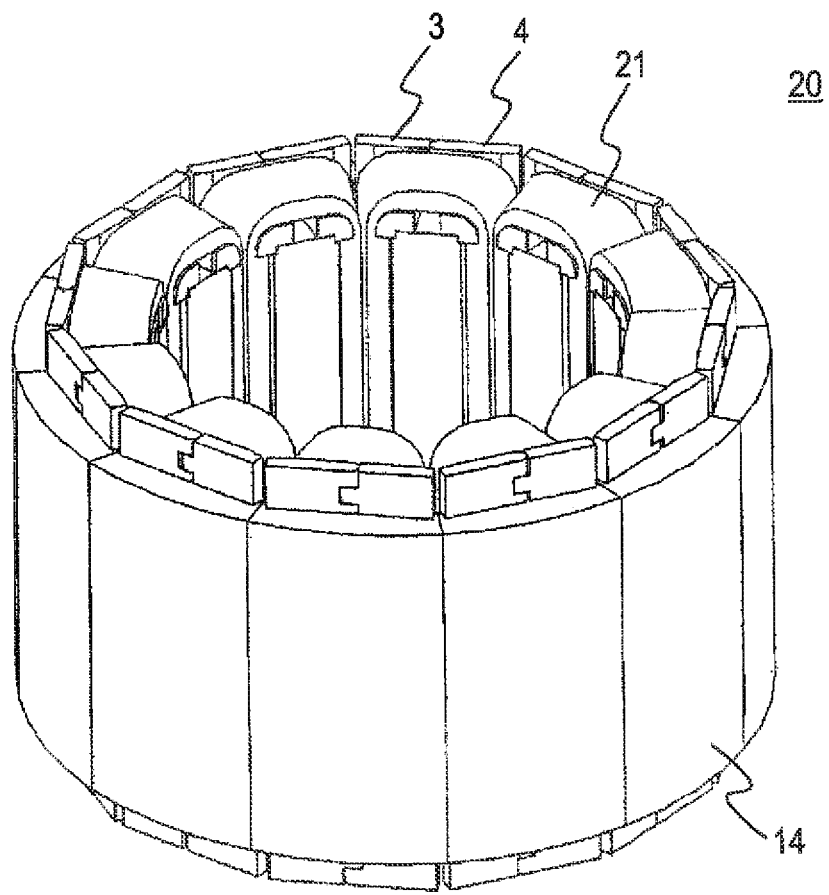
FIG. 1 is a perspective view of an armature of a rotating electrical machine of a first embodiment of the invention.

A first embodiment of the invention will be described with reference to FIGS. 1 to 9. Meanwhile, the same reference numerals denote the same portions or equivalent portions in each drawing.

Figure 2:
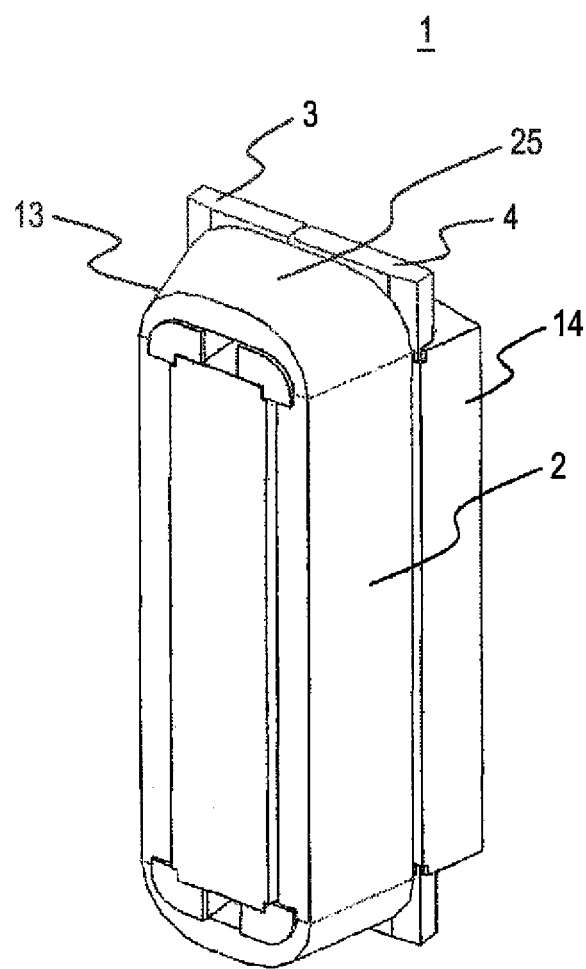
FIG. 2 is a perspective view of one tooth of the armature of the first embodiment of the invention to which molded members are applied.
Figure 3:
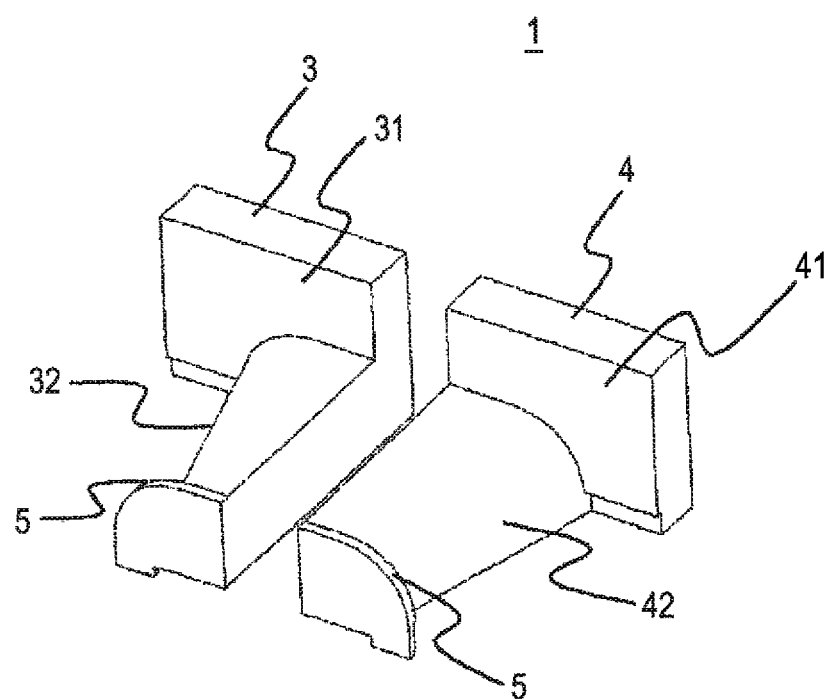
FIG. 3 is a perspective view of divided first and second members of the molded member of the first embodiment of the invention.
Figure 4:
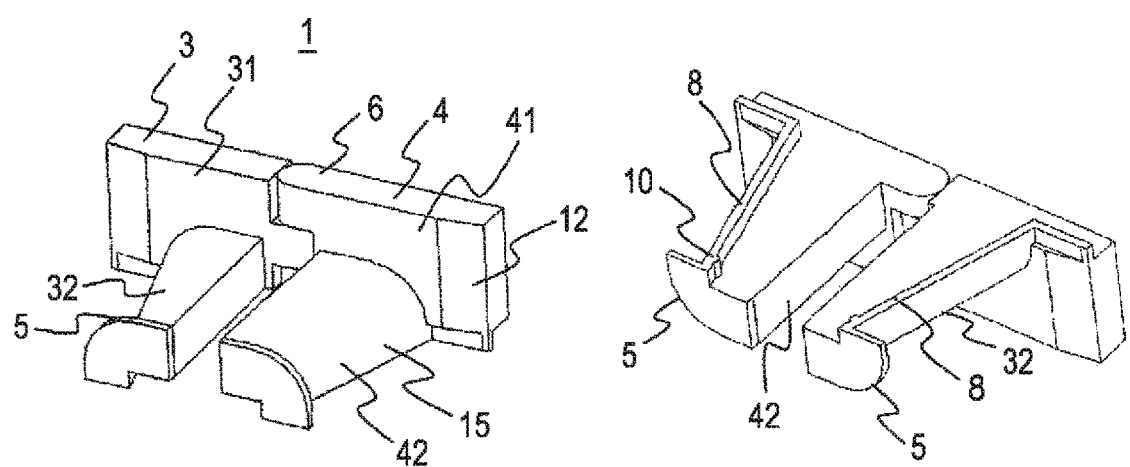
FIG. 4 is a perspective view of the molded member, which is connected by a hinge, of the first embodiment of the invention.

FIG. 1 is a perspective view of an armature of a rotating electrical machine (hereinafter, simply referred to as a stator) of a first embodiment of the invention, FIG. 2 is a perspective view of one tooth portion of the stator of the first embodiment, FIG. 3 is a perspective view of first and second members forming a molded member of the first embodiment, and FIG. 4 is a perspective view of the molded member that is connected by a hinge.

In FIGS. 1 to 4, reference numeral 1 denotes a molded member that is a main part of the invention and is made of a resin material, and the molded member insulates a coil end 25 of a stator coil (hereinafter, simply referred to as a coil) 13, which is wound on a tooth of a stator core 14, from the stator core 14.

The stator core 14 is formed by laminating electromagnetic steel sheets in an axial direction of a rotating machine, and the laminated electromagnetic steel sheets are coupled to each other by the caulking of the steel sheets. A coil, which is obtained by bending a rectangular copper wire with a film in an edgewise direction and winding the rectangular copper wire in a tapered shape in which the width of a coil end 25 is reduced toward a tooth tip of the stator core 14, is used as the coil 13 of a stator 20.

The molded member 1 is made of an insulating resin, such as a PPS, (polyphenylene sulfide) resin or an LCP (liquid crystal polymer) resin.

The molded member 1 is divided into a first member 3 and a second member 4. As shown in FIG. 3 the first and second members 3 and 4 include back portions 31 and 41, coil mounting portions 32 and 42 which extend from the back portions and on which the coil end 25 of the coil 13 is mounted, and flanges 5 that are formed at tips of the coil mounting portions 32 and 42 (tooth tips), respectively.

Further, the dimension of the radius R1 of curvature of a curved surface of an edge portion of each of the flanges is equal to or larger than the dimension of the radius R2 of curvature of the inside of the coil end so that the length of a portion of each flange 5 protruding toward the lateral side of the coil is large.

Figure 5:
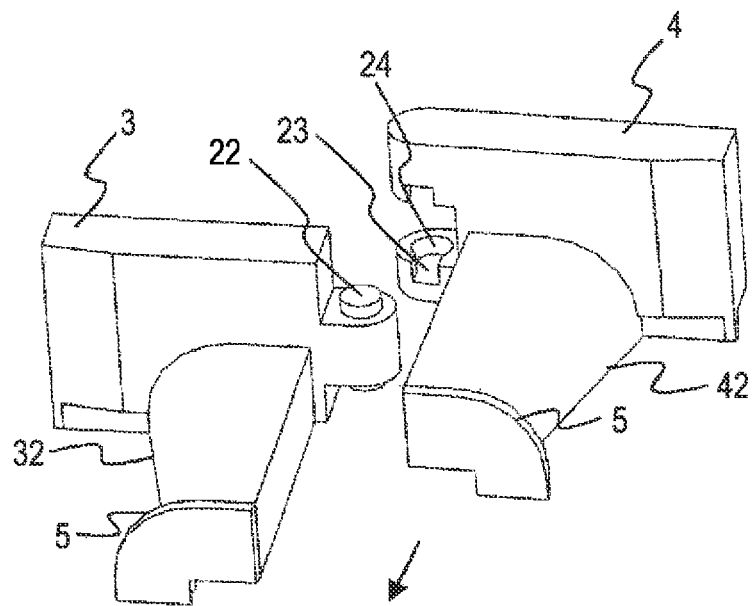
FIG. 5 is a view showing the structure of the hinge of the molded member of the first embodiment of the invention.
Figure 5:
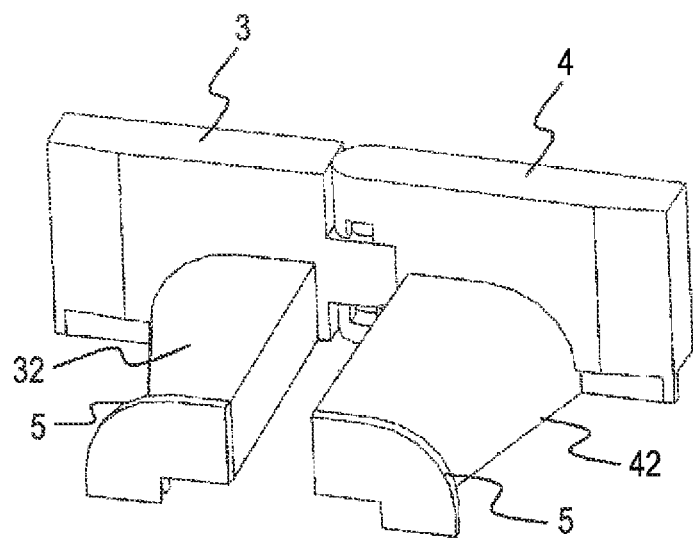

The first and second members 3 and 4 are coupled to each other by a resin-molded hinge 6 that is coupling means. Accordingly, when the first and second members 3 and 4 are rotated about the hinge 6, a gap between the flanges 5 formed at the tooth tips is changed. That is, as shown in FIG. 5, when a protruding portion 22 formed at the first member 3 is press-fitted to a notch 23 formed at the second member 4 in a radial direction and the protruding portion 22 is inserted into a protruding portion receiver 24 formed at the second member 4, the protruding portion 22 and the protruding portion receiver 24 are rotatably fitted to each other. Accordingly, the hinge 6 is adapted to couple the first and second members 3 and 4 so that the first and second members 3 and 4 can be rotated (or opened and closed)

Figure 6:
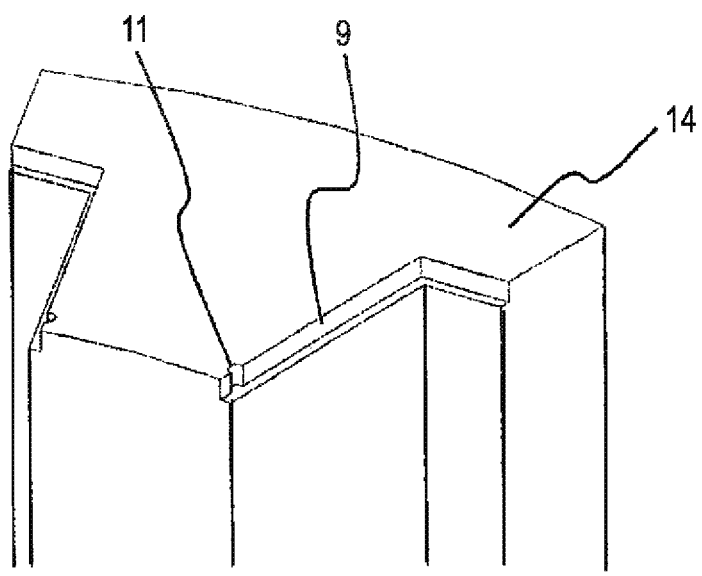
FIG. 6 is a perspective view of a stator core of the first embodiment of the invention.

As shown in FIGS. 4 and 6, stepped portions 8 are formed on the surfaces, which come into contact with the stator core 14, of the coil mounting portions 32 and 42 of the first and second members 3 and 4, respectively, and stepped portions 9, which are fitted to the stepped portions 8, are formed at the stator core 14.

Further, protrusions 10 are formed on the surfaces, which come into contact with the stator core 14, of the coil mounting portions 32 and 42 of the first and second members 3 and 4, respectively, and recesses 11, which are fitted to the protrusions 10, are formed at the stator core 14.

Furthermore, as shown in FIG. 4, chamfers 12 are formed on the back portions 31 and 41, which are core back-side walls of the first and second members 3 and 4, respectively, so as to prevent the interference between the coil and the molded members, when the molded members 1 are inserted into the coil 13.

Figure 7:
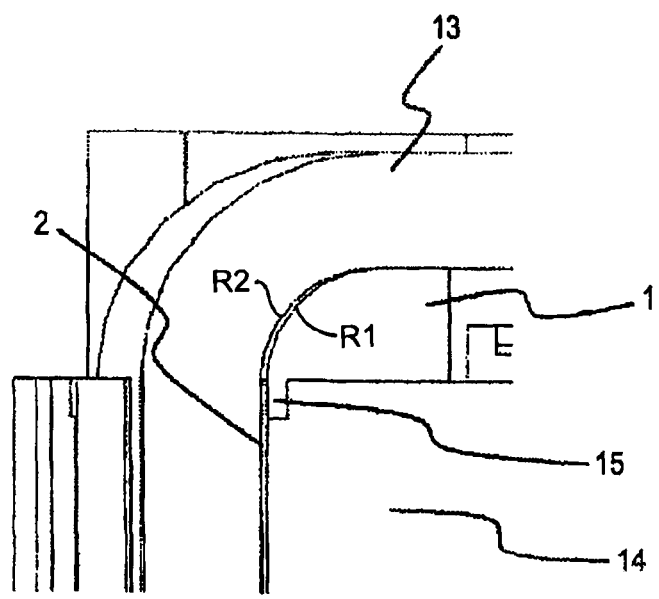
FIG. 7 is a view showing a state in which a coil and insulating paper of the first embodiment of the invention are mounted.

Meanwhile, as shown in FIG. 7, insulating paper 2, which insulates the coil from an inner wall of the slot, is wound on long side portions of the coil 13 that is positioned in a slot of the stator core 14. Accordingly, when the insulating paper 2 is mounted on the coil 13 the insulating paper 2 has a dimension overlapping end portions 15 on the curved surfaces of the coil mounting portions 32 and 42 of the molded member 1, which comes into contact with the coil 13, in the longitudinal direction of the coil 13.

Next, a method of mounting the molded members 1, the 13, and the stator core 14 will be described with reference to FIGS. 8 and 9.

Figure 8:
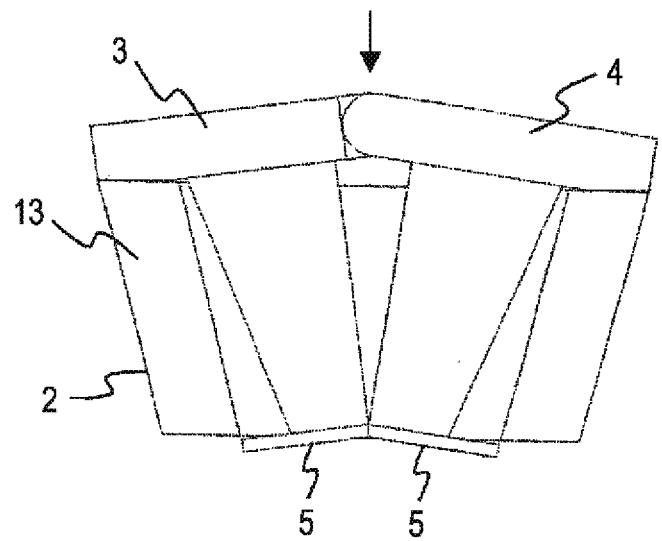
FIG. 8 is a view showing a state in which the molded member and the coil of the first embodiment of the invention are assembled.
Figure 8:
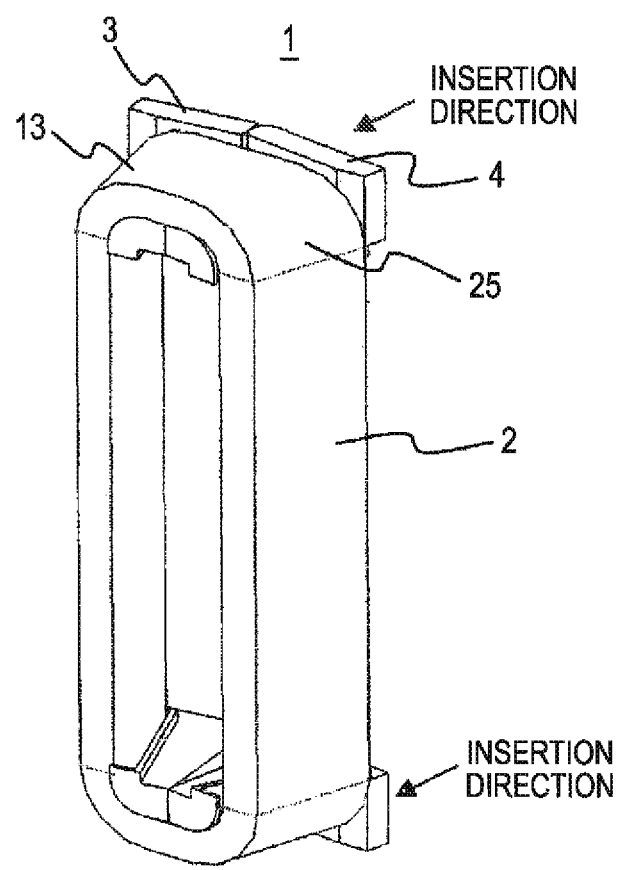
Figure 9:
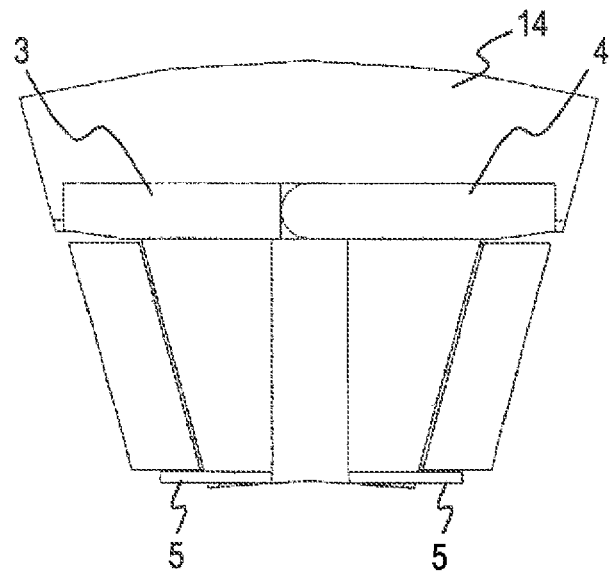
FIG. 9 is a view showing a state in which the molded members, the coil, and the stator core of the first embodiment of the invention are assembled.
Figure 9:
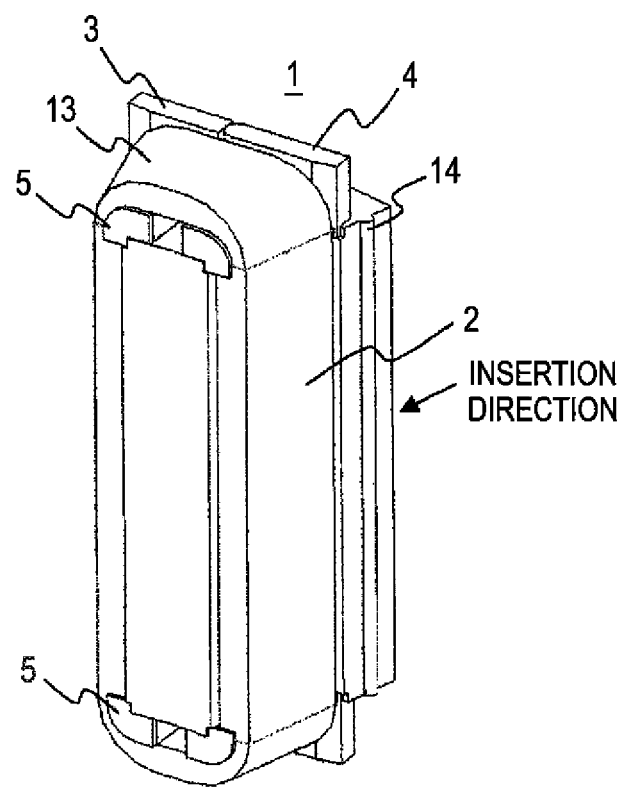

While the gap between the flanges 5 is narrowed, the molded members 1 are inserted within the coil ends 25 of the coil 13, on which the insulating paper 2 is wound the long side portions, from the back side of the core (FIG. 8).

For example, a device, which can allow the molded members 1 to come into contact with the insides of the coil ends 25 and maintain the molded members 1, is employed for insertion. When the molded members are inserted, the molded members are inserted until the flanges 5 protrude from the side surface of the tip of the coil 13.

Subsequently, the stator core 14 is inserted from the back side of the core. The stepped portions 8 of the molded members 1 and the stepped portions 9 of the stator core 14 are fitted to each other, so that the flanges 5, between which the gap has been narrowed, of the molded members 1 are spread out (FIG. 9). When the flanges 5 reach the side surface portions of the coil 13, the coil 13 is supported in an axial direction of winding. When the stator core 14 is inserted up to the tip of the coil 13, the protrusions 10 of the first and second members 3 and 4 are fitted to the recesses 11 of the stator core 14. Accordingly, the molded members 1 are fixed to the stator core 14.

As described above, according to the armature of the rotating electrical machine of the first embodiment of the invention, it is possible to obtain the following excellent effects.

(1) Since the molded member 1 can pass through the coil from the back side of the core toward the tooth tips while the molded members 1 come into contact with the insides of the coil ends 25, assemblability is improved by one-direction assembly.

Further, since the molded members 1 are divided and the first and second members are coupled to each other by the hinge that is rotatable coupling means, the first and second members 3 and 4 can move much in the width direction of a tooth. Accordingly, the dimension of each of the flanges 5 (the length of a portion of each flange 5 protruding toward the lateral side of the coil) can be made large, so that it is possible to improve insulation performance and the reliability of the fixing of the coil.

(2) Since the first and second members 3 and 4 of the molded member ere coupled to each other by the hinge 6, it is possible to handle the divided members as a single member. Furthermore, since the rotational movement of the flange 5 can be defined by the member, it is possible to simplify the mechanism of a device that inserts the molded member.

(3) Since the dimension of the radius R1 of curvature of the curved surface of the edge portion of each of the flanges 5, which are formed at the tips of the first and second members 3 and 4, is equal to or larger than the dimension of the radius R2 of curvature of the inside of the coil end, it is possible to make the length of a portion of each flange 5, which protrudes toward the lateral side of the coil, large.

(4) The stepped portions 8 are formed on the surfaces, which come into contact with the stator core, of the first and second members 3 and 4, respectively, and the stepped portions 9, which are fitted to the stepped portions 8, are formed at the stator core 14. Accordingly, since the flanges 5 of the molded members 1 are opened when the stator core 14 is inserted into the coil after the molded members 1 are inserted into the coil 13, it is possible to omit a step of opening the flanges 5.

(5) Further, since the protrusions 10 are formed on the stepped portions 8 and the recesses 11 to be fitted to the protrusions 10 are formed on the stator core 14, the protrusions 10 are fitted to the recesses 11. Accordingly, the stator core 14 and the coil 13 are not separated.

(6) In addition, since the chamfers 12 are formed on the back portions (core back-side walls) 31 and 41 of the first and second members 3 and 4, the interference between the side surfaces of the coil and the molded members is prevented when the molded members 1 are inserted into the coil 13. Accordingly, it is possible to make a coil space large.

Second Embodiment

A second embodiment of the invention will be described with reference to FIGS. 10 to 14. Meanwhile, the same reference numerals as those of the first embodiment denote the same portions or equivalent portions in each drawing.

Figure 10:
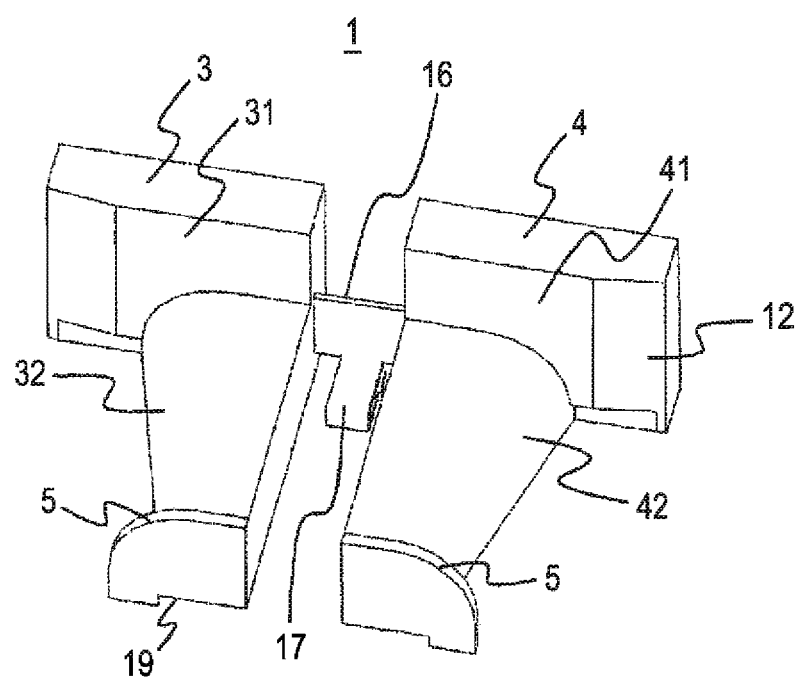
FIG. 10 is a perspective view of a molded member of a second embodiment of the invention.
Figure 11:
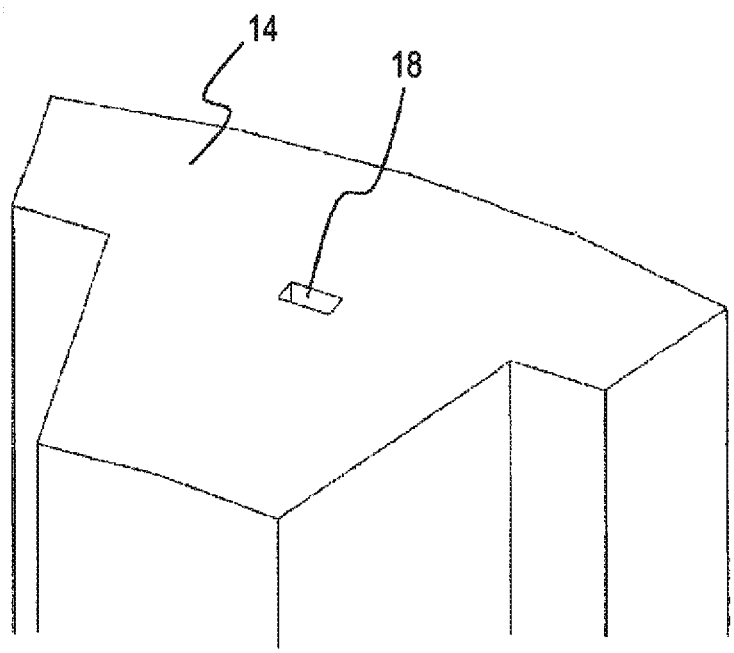
FIG. 11 is a perspective view of a stator core of the second embodiment of the invention.
Figure 12:
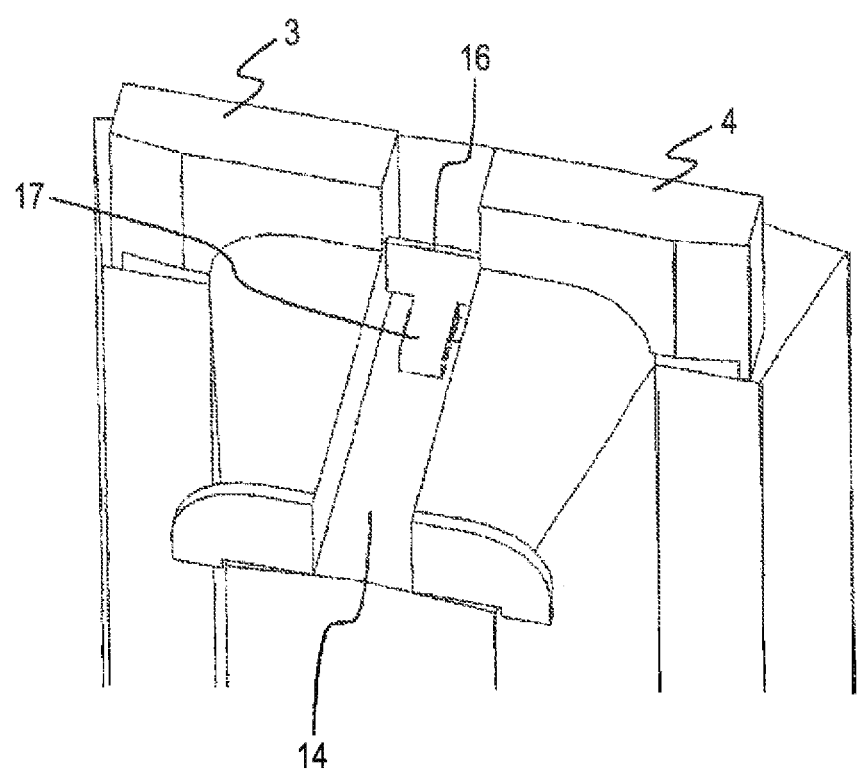
FIG. 12 is a view showing a state in which the molded member and the stator core of the second embodiment of the invention are assembled.

FIG. 10 is a perspective view of a molded member of a second embodiment of the invention, FIG. 11 is a perspective view of a stator core corresponding to the molded member of FIG. 10, and FIG. 12 is a perspective view showing a state in which the molded member and the stator core are assembled.

In FIGS. 10 to 12, a molded member 1 is divided into first and second members 3 and 4, and the first and second members 3 and 4 are coupled to each other by a plate-like elastic body 16 that is coupling means. Accordingly, when the plate-like elastic body 16 is elastically deformed, a gap between flanges 5 formed at tooth tips is changed. The plate-like elastic body is a material that is formed so as to have spring characteristics by performing a heat treatment on, for example, SUS304. A method of connecting the first and second members 3 and 4 to the plate-like elastic body 16 is performed by, for example, inserting the plate-like elastic body 16 into grooves, which are formed at the first and second members 3 and 4, or insert molding.

Figure 13:
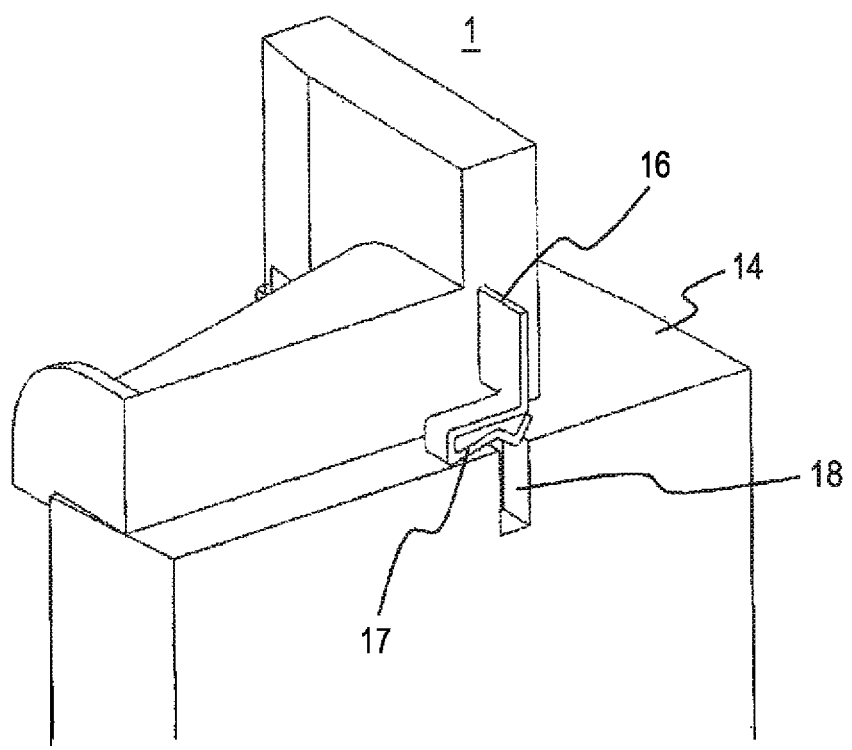
FIG. 13 is a view showing a portion where the molded member and the stator core of the second embodiment of the invention are fixed to each other.
Figure 14A:
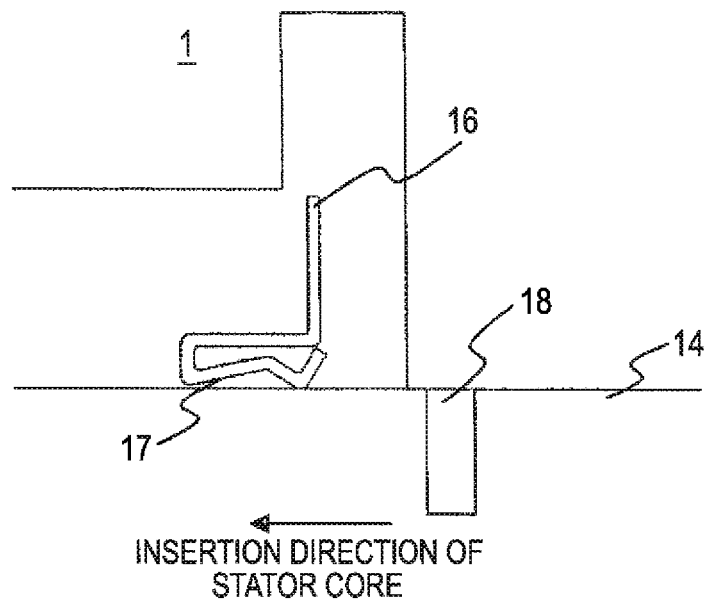
FIG. 14(a) is a view showing a state in which the stator core is being inserted.
Figure 14B:
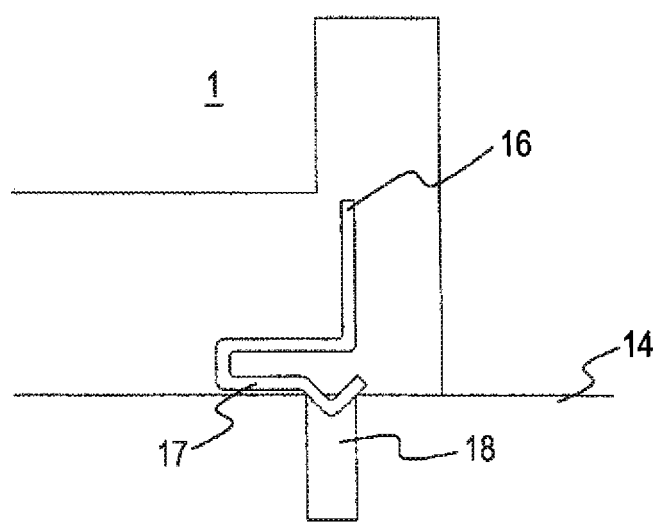
FIG. 14(b) is a view showing a state in which the stator core and the molded member have been completely fixed to each other.

FIG. 13 is a view showing a portion where the molded member 1 and a stator core 14 are fixed to each other, FIG. 14(*a*) is a view showing a state in which the stator core 14 is being inserted into the molded member 1, and FIG. 14(*b*) is a view showing a state in which the molded member 1 and the stator core 14 have been completely fixed to each other s shown in FIGS. 13 and 14, a leaf spring shape 17, which is formed by folding, is formed at a portion, which comes into contact with the stator core 14, of the plate-like elastic body 16 that couples the first member 3 to the second member 4, and holes 18 into which the leaf spring shapes 17 are to be fitted are formed at the stator core 14.

As shown in FIG. 10, chamfers 12 are formed on back portions 31 and 41, which are core back-side walls of the first and second members 3 and 4, respectively, so as to prevent the interference between the coil and the molded members when the molded members 1 are inserted into the coil 13 Further, stepped portions 19 are formed at the lower portions of the flanges 5 of the first and second members 3 and 4. Accordingly, when the stator core 14 is inserted into the molded member 1 as shown in FIG. 12, a tooth tip of the stator core 14 is fitted to the stepped portions 19. As a result, the molded member 1 is supported in a circumferential direction by the stator core 14.

Meanwhile, similar to the first embodiment shown in FIG. 7, insulating paper 2, which insulates the coil from an inner wall of the slot, is wound on long side portions of the coil 13 that is positioned in a slot of the stator core 14. Accordingly, when the insulating paper 2 is mounted on the coil 13, the insulating paper 2 has a dimension overlapping end portions 15 on the curved surfaces of the coil mounting portions 32 and 42 of the molded member 1, which comes into contact with the coil 13, in the longitudinal direction of the coil 13.

Next, a method of mounting the molded members 1, the coil 13, and the stator core 14 will be described.

While a gap between the flanges 5 is narrowed by a load applied to both outer surfaces of the first and second members 3 and 4 of the molded members 1 as in the FIG. 8 of the first embodiment, the molded members 1 are inserted within coil ends 25 of the coil 13, on which the insulating paper 2 is wound the long side portions, from the back side of the core.

For example, a device, which can allow the molded members 1 to come into contact with the insides of the coil ends 25 and maintain the molded members 1, is employed for insertion. When the molded members are inserted, the molded members are inserted until the flanges 5 protrude from the side surface of the tip of the coil 13.

When the load applied to the molded members 1 is removed, the flanges 5 are spread out to both sides by an elastic force of the plate-like elastic body 16. When the flanges 5 reach side surface portions of the coil 13, the coil 13 is supported in an axial direction of winding. Subsequently, the stator core 14 is inserted from the back side of the core.

When the stator core 14 is inserted into the coil to the end as shown in FIGS. 12 to 14, the leaf spring shapes 17 are fitted to the holes 18 formed at the stator core 14 and the tooth tip of the stator core 14 is fitted to the stepped portions 19 that are formed at the lower portions of the flanges 5. Accordingly, the molded members 1 are fixed to the stator core 14.

As described above, according to the armature of the rotating electrical machine of the second embodiment of the invention, it is possible to further obtain the following excellent effects in addition to the effects of the first embodiment.

(1) Since the first and second members 3 and 4 are coupled to each other by the plate-like elastic body 16, it is possible to open the flanges 5 by only removing a load that is applied when the molded members 1 are inserted into the coil 13. Accordingly, it is possible to simplify the mechanism of a device that inserts the molded member.

(2) Further, the stepped portions 19 to which the tooth tip of the stator core 14 is fitted are formed at the lower portions of the flanges 5, the leaf spring shape 17, which is formed by folding, is formed at a portion, which comes into contact with the stator core 14, of the plate-like elastic body 16, and the holes 18 into which the leaf spring shapes 17 are to be fitted are formed at the stator core 14. Accordingly, the stator core is easily inserted into the molded members, so that the molded members 1 can be more reliably fixed to the stator core 14.

INDUSTRIAL APPLICABILITY

The invention is suitable as an armature of a rotating electrical machine, such as a generator or an electric motor, of which a stator is formed using an edgewise coil.

REFERENCE SIGNS LIST

1: molded member
2: insulating paper
3: first member
4: second member
3: flange
6: hinge
8: stepped portion
9: stepped portion
10: protrusion
11: recess
12: chamfer
13: coil
14: stator core
15: end portion of molded member
16: plate-like elastic body
17: leaf spring shape
18: hole
19: stepped portion
20: stator
21: one tooth of stator
22: protruding portion
23: notch
24: protruding portion receiver
25: coil end
31, 41: back portion
32, 42: coil mounting portion

The invention claimed is:

1. An armature of a rotating electrical machine comprising:
a stator core;
an edgewise coil that is formed by bending a rectangular copper wire in an edgewise direction; and
a molded member that is inserted into a coil end portion of the edgewise coil and is formed of an insulating member insulating the edgewise coil wound on a tooth of the stator core from the stator core and supporting the edgewise coil,
wherein the molded member is formed of a first member and a second member,
each of the first member and the second member includes a back portion, a coil mounting portion which extends from each back portion and on which the coil end of the edgewise coil is mounted, and a flange that is formed at a tooth tip of the coil mounting portion,
the first member and the second member are coupled to each other by rotatable coupling means which provides a changeable space between the flanges of the coil mounting portions, so that the space between the flanges of the coil mounting portions are changeable before and after insertion of the coil mounting portions into the edgewise coil,
the coil end of the edgewise coil is insulated by the molded member, and
the edgewise coil positioned in a slot of the stator core is insulated from an inner wall of the slot by insulating paper, so that the insulating paper is provided between the edgewise coil and at least a portion of at least one of the first and second members and directly contacts a surface of the tooth of the stator core.

2. The armature of a rotating electrical machine according to claim 1,
wherein the coupling means, which couples the first member to the second member, is formed of a hinge mechanism.

3. The armature of a rotating electrical machine according to claim 2,
wherein a stepped portion is formed on a surface, which comes into contact with the stator core, of each of the coil mounting portions of the first and second members, and a stepped portion, which is fitted to the stepped portion, is formed at the stator core.

4. The armature of a rotating electrical machine according to claim 3,
wherein protrusions are formed on the stepped portions of the coil mounting portions, and recesses, which are to be fitted to the protrusions, are formed at the stator core.

5. The armature of a rotating electrical machine according to claim 1,
wherein the coupling means, which couples the first member to the second member, is formed of a plate-like elastic body.

6. The armature of a rotating electrical machine according to claim 5,
wherein stepped portions are formed at lower portions of the flanges of the first and second members,
a leaf spring shape, which is formed by folding, is formed at a portion, which comes into contact with the stator core, of the plate-like elastic body, and
a hole to which the leaf spring shape is to be fitted is formed at the stator core.

7. The armature of a rotating electrical machine according to claim 1,
wherein the dimension of a radius of curvature of a curved surface of an edge portion of each of the flanges, which are formed at tips of the first and second members, is equal to or larger than the dimension of a radius of curvature of the inside of the coil end.

8. The armature of a rotating electrical machine according to claim 1,
wherein chamfers are formed on the back portions, which are provided on the back side of the stator core, of the first and second members.

9. The armature of a rotating electrical machine according to claim 1, wherein two pairs of coupled first and second members are provided on each tooth of the stator core.

10. The armature of a rotating electrical machine according to claim 1, wherein the first member and the second member that are detachably attached to each other by the rotatable coupling means.

* * * * *